United States Patent
Deorkar et al.

(10) Patent No.: US 7,470,767 B2
(45) Date of Patent: Dec. 30, 2008

(54) PREPARATION OF ULTRAPURE POLYMERIC ARTICLES

(75) Inventors: Nandu Deorkar, Cedar Knolls, NJ (US); Paul Bouis, Bethlehem, PA (US)

(73) Assignee: Mallinckrodt Baker, Inc., Phillipsburg, NJ (US)

(*) Notice: Subject to any disclaimer, the term of this patent is extended or adjusted under 35 U.S.C. 154(b) by 119 days.

(21) Appl. No.: 11/631,586

(22) PCT Filed: Jul. 6, 2005

(86) PCT No.: PCT/US2005/023967

§ 371 (c)(1),
(2), (4) Date: Jan. 4, 2007

(87) PCT Pub. No.: WO2006/023129

PCT Pub. Date: Mar. 2, 2006

(65) Prior Publication Data

US 2007/0249804 A1    Oct. 25, 2007

(51) Int. Cl.
*C08F 6/00* (2006.01)
*C08G 64/00* (2006.01)

(52) U.S. Cl. .............. 528/480; 134/2; 134/18; 134/26; 210/600; 264/176.1; 264/219; 264/488; 510/175; 526/64; 528/480

(58) Field of Classification Search ............ 134/2, 134/18, 26; 210/600; 264/176.1, 219, 488; 510/175; 526/64; 528/480
See application file for complete search history.

(56) References Cited

FOREIGN PATENT DOCUMENTS

| DE | 3323940 | 1/1985 |
|---|---|---|
| DE | 39 38 877 | 5/1991 |
| EP | 1 712 569 A1 | 10/2006 |
| JP | 2001 192409 | 7/2001 |

*Primary Examiner*—Terressa M Boykin
(74) *Attorney, Agent, or Firm*—George W. Rauchfuss, Jr.; Ohlandt, Greeley, Ruggiero & Perle

(57) ABSTRACT

Ultrapure olefinic polymeric articles of manufacture can be prepared by a process comprising: providing olefinic polymeric material containing impurities, subjecting the olefinic polymeric material to supercritical $CO_2$ at a pressure of at least about 4000 psi (281.23 kg/cm$^2$) at a temperature of from about 35° C. and above, to extract the impurities from the olefinic polymeric material and produce ultrapure olefinic polymeric material, and molding ultrapure articles of manufacture from the ultrapure, olefinic polymeric material.

14 Claims, No Drawings

PREPARATION OF ULTRAPURE POLYMERIC ARTICLES

FIELD OF THE INVENTION

The invention relates to the preparation and manufacture of ultra-pure polymeric articles. The invention discloses separation of impurities from polymeric material, such as polymeric pellets, by use of supercritical $CO_2$ extraction and molding of the purified polymeric material to prepare articles that are ultrapure. In accordance with the invention It was unexpectedly discovered that efficient removal of organic contaminants, such as monomers, oligomers, and short chain polymers can be quantitatively achieved even without the use of organic additives in the supercritical fluid, and that articles can be molded after removal of various modifiers and polymeric chains without reoccurrence of the impurities. Such molded articles do not show reoccurrence or leaching of additives or impurities, such as short polymeric chains, oligomers and additives. The polymeric articles can be prepared by molding ultra-pure plastic material using a variety of techniques such as injection molding, blow molding, and the like.

BACKGROUND TO THE INVENTION

Polymeric materials contain low molecular weight impurities that come from a variety of sources. For example, the process for the manufacture of polymeric materials can result in impurities, such as the presence of residual monomers or non-polymerizable impurities present in the monomers, short chain oligomers and products resulting from the decomposition of products added to the polymerization mixture to initiate/catalyze/or accelerate the reaction. Sometimes, organic solvents are also added to the polymerization mixture to facilitate processabilty (e.g., to lower the viscosity) or to impart certain morphological characteristics to the final polymeric material product. Furthermore, low molecular weight additives are sometimes added to polymeric materials to improve their performance in use. These additives include plasticizers, anti-oxidants, light stabilizers, and the like.

Once the polymeric raw material has been incorporated or formed into an article of manufacture, these impurities can present a problem, ranging from minor to serious, particularly depending upon what the formed article is. These impurities can diffuse out of the polymer phase into the various streams with which the polymer enters into contact. This possible contamination is of particularly concern for articles used in medical applications, such as for example, in bottles and drums to be used as packaging for ultrapure chemicals or reagents, beakers, funnels, separatory funnels, reactors and chambers, plastic columns, pipes, tubing, connectors, screens and adapters to be used in laboratory equipment and/instruments, blood bags, oxygen tubing, intravenous equipment, enteral food or parental nutrition bags, implants, food packaging, and toys and the like. For instance, concerns about the use of phthalates as plasticizers in PVC have recently been raised; C&E News, Aug. 7, 2000, 52-54; Science News, 158, 152-154, September 2000. Contamination of streams coming in contact with a plastic article is also of concern in analytical applications or medical research, particularly in "throw-away" once-through articles that typically receive little conditioning before use. For example, it is known that the light stabilizer Tinuvin 770 that elutes from polypropylene tubes is a potent L-type $Ca^{2+}$ channel blocker; H. S. Glossman et al., Proc. Natl. Acad. Sci. USA 90, 9523-9527 (1993). Other examples of such articles or devices where diffusion of impurities out of the plastic article or device can present significant problems are bottles and drums to be used as packaging for ultrapure chemicals or reagents, beakers, funnels, separatory funnels, reactors and chambers, plastic columns, pipes, tubing, connectors, screens and adapters to be used in laboratory equipment and/instruments, blood bags, oxygen tubing, intravenous equipment, enteral food or parental nutrition bags, implants, food packaging, and toys.

Methods for removing low molecular weight impurities from polymeric materials have been recently reviewed in H. J. Vandenburg et al., Analyst 122, 101R-115R (1997). One such method consists in dissolving the polymer and its impurities in a suitable solvent, precipitation of the polymer and analysis of the content of the supernatant. This method has been used to analyze residual monomers and oligomers in polyethylene terephtalate, plasitcizers or stabilizers in poly(vinyl chloride), additives in polyethylene, polypropylene, polyamides, polycarbonates and polysulfones. Although this dissolution approach provides fast and complete separation of low molecular weight components from polymeric materials, it is apparent that it is not applicable when the purpose of the extraction is to produce a cleaner polymeric article in its original physical form (e.g., pellets for molding), nor applicable to non soluble (e.g., crosslinked) polymers.

Low molecular weight components or impurities can be extracted form polymers, in a batch equilibration or continuous extraction mode without irreversibly affecting the physical form of the latter by contacting said polymers with solvents that do not cause it to dissolve. Although numerous examples of this method have been discussed, including the extraction of additives from polyethylene and polypropylene, these methods relate primarily to the analysis of additives as opposed to residual monomers or oligomers.

All the extraction methods described above are analytical procedures aimed at identifying and quantifying the amount of low molecular weight contaminants present in polymeric materials and not for providing ultrapure polymeric materials and articles manufactured therefrom.

Although solvent extraction can be an effective cleaning procedure, a certain number of problems are also associated with it. The solvent extraction process operation usually requires the use of rather large quantities of solvents. First, this has a negative impact on cost, both in solvent purchase and disposal or recycling of the solvent. Secondly, depending on the nature of the solvent used for the procedure, flammability, VOC emission or other environmental issues can come into play. Additionally, lengthy drying procedures are usually required to fully remove from the polymeric material the very substance that is used to clean it, resulting in increased operational complexity and higher costs.

A number of the issues associated with cleaning up polymeric materials using organic solvents can be avoided by using aqueous streams or steam. However, because the impurities that one is attempting to remove are often hydrophobic in nature, and because water is often not a particularly good swelling agent for the polymer phase at hand, their removal with water is not particularly efficient. Steam can be more effective but, with most polymeric materials, one is limited in the maximum temperature that can be used by either degradation of polymer morphology or the onset of chemical decomposition. Although the extraction of impurities from the bulk of finely divided polymers by aqueous solutions containing peroxides has been disclosed in European Patent Publication No. EP 0 652 283, more often than not, aqueous based procedures are used to clean the surface of polymeric materials rather than to extract contaminants from inside the polymer phase. The cleaning of polymer surfaces by various aqueous based streams has been reviewed by B. Weiss, Oberflasche JOT 26(9), 27-34 (1989).

Whether water or steam is used for the removal of contaminants, the cleaned-up polymeric material is typically recovered wet with water, and, if a final product in the dry form is desired, the drying procedures are even more involved and energy intensive than in the case of organic solvents.

Removal and recovery of unreacted monomers from latex coagulums using hot water have been described in U.S. Pat. No. 3,954,910, but the approach appears limited to hydrophilic monomers such as monounsaturated nitrites.

Accelerated extraction of additives from polymeric material using organic solvents in the supercritical domain for analytical purposes has been described in H. J. Vandenburg et al., Anal Chem., 70, 1943-1948 (1998). Although it was demonstrated that accelerated extraction of stabilizers could be achieved relative to conventional extraction methods, the same problems discussed above in relation to conventional solvent extraction come into play here as well.

Furthermore, even though it has been possible to clean polymer materials using such solvent or aqueous processes, upon molding the polymeric materials into articles the polymeric material in the articles has been found to contain impurities such as oligomers or monomeric material produced as a result of the heat of the molding operation.

Simply for analytical purposes, supercritical $CO_2$ has been used to remove monomers and low molecular weight oligomers from polymer such as nylon, poly alkylene terephtalates or polystyrene. In the particular case of polyethylene terephtalate, removal of low molecular weight by-products by supercritical $CO_2$ during the polymerization process has been described—L. C. Burke et al., Polym. Mater. Sci. Eng. 74, 248-249 (1996). Except at very high temperatures, the addition of organic modifiers is required to achieve complete quantitative extraction. Supercritical extraction of stabilizing additives from articles made from PE and PP for analytical purposes is described as being possible with $CO_2$ only—N. J. Cotton et al., J. Appl. Polym Sci. 48 (9), 1607-1619 (1993). The impact of various parameters on the efficiency of the additives extraction process has been studied—L. Xiamen et al., J. Microcolumn September 7 (4), 303-317 (1995); H. J. Vanderburg, et. al., Anal. Chem 70 (9), 1943-1948, (1998); F. Martial et al., Polym. Int. 48 (8), 299-306 (1999), L. Y. Zhou et al., J. Chrom. A 858 (2), 209-218 (1999). However, we are aware of no reports describing the quantitative extraction of monomers or oligomers specifically from polypropylene or polyethylene raw materials and then producing article of manufacture from the purified polymer without again producing oligomeric or monomeric impurities as a result of the molding operation of the article of manufacture, although one report describes extraction of "paraffins and olefins" from polyethylene for cytotoxicity testing, using supercritical $CO_2$—J. H. Braybrook et al., Polymer International, vol. 27, pp. 157-164 (1992).

As in the case of the extraction of residual monomers and oligomers from nylon, polyalkylene terephtalates or polystyrene, organic additives or "modifiers" are sometimes added to supercritical $CO_2$ to enhance the extraction of additives from polyethylene or polypropylene—A. Pinto and L. Taylor, J. Chrom A 811 (1+2), 163-170 (1998). The use of such modifiers has been applied to analyze for the presence of potential migrants from polypropylene in food contact applications—T. Buecherl et al., Dtsch. Lebensm.—Rundsch. 89 (3), 69-71 (1993).

There remains need for a quantitative process for extraction of impurities from polymeric material such as polyolefins, e.g., polyethylene and polypropylene, and the ability to prepare ultrapure polymeric articles from the polymeric material without the reoccurrence of impurities, such as monomers or oligomers or short polymeric chains, when the polymeric articles are formed.

BRIEF SUMMARY OF THE INVENTION

In accordance with this invention, ultrapure olefinic polymeric articles of manufacture can be prepared by a process comprising: providing olefinic polymeric material containing impurities, subjecting the olefinic polymeric material to supercritical $CO_2$ at a pressure of at least about 4000 psi (281.23 kg/cm$^2$) at a temperature of from about 35° C. and above, to extract impurities from the olefinic polymeric material and produce ultrapure olefinic polymeric material, and molding ultrapure articles of manufacture from the ultrapure olefinic polymeric material. This process of quantitatively extracting impurities from olefinic polymeric materials containing impurities and molding ultrapure olefinic polymeric articles of manufacture from the purified olefinic polymeric material can be accomplished without the necessity for using additive during the extraction step. Additionally, it was unexpectedly discovered that even though the purified olefinic polymeric material is subjected to high temperatures during the molding step there is no reoccurrence of impurities, such as short polymeric chains, oligomers and monomers, that usually occur when olefinic polymeric material is molded following other types of purification procedures.

DETAILED DESCRIPTION OF THE INVENTION AND PREFERRED EMBODIMENTS

In accordance with this invention, ultrapure olefinic polymeric articles of manufacture can be prepared by a process comprising: providing polymeric material containing impurities, subjecting the olefinic polymeric material to supercritical $CO_2$ at a pressure of at least about 4000 psi (281.23 kg/cm$^2$), preferably at a pressure of from about 4000 psi (281.23 kg.cm$^2$) to about 10,000psi (703.67 kg.cm$^2$), more preferably at a pressure of about 5000 psi (351.53 kg.cm$^2$) and most preferably at a pressure of bout 9500 psi (667.92 kg.cm$^2$), at a temperature of from about 35° C. and above, preferably at a temperature of from about 50° C. to about 120° C., more preferably from about 100° C. to about 120° C., to extract impurities from the olefinic polymeric material and produce ultrapure olefinic polymeric material, and them molding ultrapure articles of manufacture from the ultrapure olefinic polymeric material, such as by extrusion molding, injection molding, blow molding or the like. The flow rate of supercritical $CO_2$ will be subjected to a number of conditions including the amount of polymeric material being purified and the size of the extraction equipment employed. Generally, the amount of $CO_2$ will be provided at a flow rate of from about 10 to about 20 L/min.

By the term "ultrapure olefinic polymeric material" is meant that the level of detectable impurities in the olefinic polymeric material is less than about 5 ppm, preferably less than 1 ppm.

The olefinic polymeric material may be any olefinic polymer, and can be high density, low density, or rigid olefinic polymer material. Suitable ofefinic polymers include for example, polyethylene, polypropylene, polybutene, poly methylpentene and the like.

The invention is illustrated by the following non-limiting examples.

Impurities from pelletized polypropylene were extracted using supercritical $CO_2$ without any organic modifiers. The polypropylene pellets are commercially pelletized polypropylene pellets available from various sources such as BP-Amoco or Exxon-Mobil. The amount of polypropylene pellets subjected to treatment in each experiment was 20 g or 40 g as indicated. The untreated, liquid $CO_2$ treated in accordance with the prior art, and supercritical $CO_2$ treated pellets were then extracted with methylene chloride by equilibration for up to seven days and the amount of contaminants contained in the methylene chloride extracts determined by GC peak area using undecene as an internal standard. The amount of these materials extracted by the supercritical $CO_2$ from the resin pellets, reported as a percentage in the last column of Table 1, were obtained by comparing the total GC peak areas for the extracted and un-extracted samples The GC MS analysis indicated that the extractables consist primarily of low molecular weight oligomers of propylene. The conditions used and the results obtained are summarized in Table 1 following Examples 1 to 8.

EXAMPLE 1

20 g of uncleaned, commercially available pelletized polyethylene from Amoco were extracted with 25 ml of methylene chloride for 24 hrs at room temperature and the extract analyzed by GC using the following conditions:

Column DB5

Carrier gas: Helium at 45 ml/min

Air: 350 ml/min $H_2$ flow: 40 ml/min

Detector: FID

Temperature profile: 3 min hold at 50° C., 15° C./min to 260° C., hold 10 min. The resulting chromatograph had a total peak area of 218000. A 20 g sample was then submitted to $CO_2$ extraction at 5000 psi (351.53 kg/cm$^2$) and 60° C. for 8 minutes at a $CO_2$ flow rate of 10 ml/min. After depressurization, the methylene chloride extraction/GC analysis procedure was repeated on 2 g of the supercritical $CO_2$ extracted polymer, giving a total peak area of 157000. This indicates that $$\frac{157000 \times 100}{218000} = 72\%$$

of extractable materials remained in the pellets, and that 28 percent had actually been extracted.

EXAMPLE 2

The same procedure as in Example 1 was employed except the pressure was 7500 psi (492.25 kg/cm$^2$), the temperature was 80° C. and the extraction time was 15 min. GC peak areas in the methylene chloride extracts before and after supercritical $CO_2$ extraction were 192000 and 125000 respectively, indicating a supercritical extraction efficiency of 35%

EXAMPLE 3

The same procedure as in Example 1 was employed except the pressure was 9500 psi (667.92 kg/cm2), the temperature was 100° C. and the extraction time was 15 min. GC peak areas in the methylene chloride extracts before and after supercritical $CO_2$ extraction were 192000 and 58000 respectively, indicating a supercritical extraction efficiency of 70%

EXAMPLE 4

The same procedure as in Example 1 was employed except the pressure was 2000 psi (140.61 kg/cm$^2$), the temperature was 60° C. for 10 minutes, and the $CO_2$ flow rate was 10 L/min. After 10 minute of flow extraction, 30 minute of static extraction was carried out. Under these conditions $CO_2$ is liquid and not supercritical. By static hold in this and the other Examples is meant a period of time during which $CO_2$ low is halted and the polymer is simply held in the $CO_2$ environment without further $CO_2$ flow. GC peak areas in the methylene chloride extracts before and after supercritical $CO_2$ extraction were 192000 and 140000 respectively, indicating a supercritical extraction efficiency of 27%

EXAMPLE 5

The same procedure as in Example 3 was employed except a static hold of 45 minutes was is added at the end of the 15 min flow extraction. No extractibles were detected in the methylene chloride extract of the supercritically extracted resin, indicating complete removal of the contaminants.

EXAMPLE 6

The same procedure as in Example 5 was employed except three pressure cycles are performed during the holding period by dropping the pressure to 7500 psi (527.30 kg/cm$^2$) and slowly increasing again to 9500 psi (667.92 kg/cm$^2$). No extractibles were detected in the methylene chloride extract of the supercritically extracted resin, indicating complete removal of the contaminants.

EXAMPLES 7

40 g of resin were extracted by $CO_2$ at 9500 psi (667.92 kg/cm$^2$) and 100° C. for 15 min at 15 L/min CO2 flow rate followed by a 45 minutes static hold during which three pressure cycles to 7500 psi (527.30 kg/cm$^2$) were performed. GC analysis indicated that the final product contained only 4 ppm extractables (96% supercritical extraction efficiency)

EXAMPLES 8

40 g of resin were extracted by $CO_2$ at 9500 psi (667.92 kg/cm$^2$) and 100° C. for 10 min at 15 L/min followed by a 40 minutes static hold during which three pressure cycles to 7000 psi (527.30 kg/cm$^2$) were performed. No extractibles were detected in the methylene chloride extract of the supercritically extracted resin, indicating complete removal of the contaminants.

TABLE 1

Supercritical $CO_2$ Extraction Experiments

| Example | Press. Psi (kg/cm$^2$) | Temp. (° C.) | Time (min) | Treatment Comment | % impurities extracted. |
|---|---|---|---|---|---|
| 1 | 5000 (351.53) | 60 | 8 | | 28 |
| 2 | 7500 (527.30) | 80 | 15 | | 35 |

TABLE 1-continued

Supercritical $CO_2$ Extraction Experiments

| Example | Press. Psi (kg/cm²) | Temp. (° C.) | Time (min) | Treatment Comment | % impurities extracted. |
|---|---|---|---|---|---|
| 3 | 9500 (667.92) | 100 | 10 | | 70 |
| 4 | 2000 (140.61) | 60 | 10 + 30 static | Liquid CO2 extraction | 27 |
| 5 | 9500 (667.92) | 100 | 15 + 45 static | | 100 |
| 6 | 9500 (667.92) | 100 | 15 + 45 static | 3 pressure cycles to 7500 during static hold. | 100 |
| 7 | 9500 | 100 | 15 + 45 static | Double amount of resin; 5 pressure cycles to 7500 during static hold. | 96 |
| 8 | 9500 9667.92) | 100 | 10 + 40 static | Double amount of resin; 4 pressure cycles to 7000 during static hold. | 100 |

As the results in Table 1 indicate, the higher pressure and temperature (Example 3) resulted in 70% of the contaminants being extracted, compared to 35% at medium temperature (Example 2) and only 28% at low pressure and temperature (Example 1) when no supercritical $CO_2$ extraction was employed. When liquid $CO_2$ is used, low extraction levels of 27% are observed as well (Example 4).

Adding a static hold and or pressure cycles at high temperature and pressure can achieve complete removal of the contaminants, which reduces the amount of $CO_2$ consumed, as shown in Examples 5 and 6. However, similar clean-up can be achieved under dynamic conditions for the same amount of time. Examples 7 and 8 show that similar results can be obtained at double the initial amount of pellets treated.

In order to further demonstrate the scalability of the process, and to prepare sample stock of clean pellets for molding experiments, further extractions were performed using 320 g of resin per run. The results of these extractions are in Table 2 following Examples 9-12.

EXAMPLE 9

320 g of uncleaned, commercially available, pelletized polypropylene resin from Amoco were extracted at 100° C. and 9500 psi (667.92 kg/cm²) using a $CO_2$ flow rate of 20 L/minute for 40 minutes, followed by a 90 minutes hold period during which 3 pressure cycles to 7000 PSI were carried out using supercritical $CO_2$ flow. After evaporation of the $CO_2$ used for the supercritical extraction procedure, the GC for the material showed 100% extraction of the impurities.

EXAMPLE 10

320 g of uncleaned, commercially available, pelletized polypropylene resin from Amoco were extracted at 120° C. and 9500 psi (667.92 kg/cm²) using a $CO_2$ flow rate of 20 L/minute for 40 minutes, followed by a 315 minutes period of 7 alternating hold and dynamic flow periods of similar duration. After evaporation of the $CO_2$ used for the supercritical extraction procedure, the GC for the material showed 100% extraction of the impurities.

EXAMPLE 11

320 g of uncleaned, commercially available, pelletized polypropylene resin from Amoco were extracted at 120° C. and 9500 psi (667.92 kg/cm²) using a $CO_2$ flow rate of 20 L/minute for 80 minutes, followed by a 360 minutes period of 6 alternating hold and dynamic flow periods of similar duration. After evaporation of the $CO_2$ used for the supercritical extraction procedure, the GC for the material showed 100% extraction of the impurities.

EXAMPLE 12

320 g of uncleaned, commercially available, pelletized polypropylene resin from Amoco were extracted at 120° C. and 9500 psi (667.92 kg/cm²) using a $CO_2$ flow rate of 15 L per minute for 140 minutes. After evaporation of the $CO_2$ used for the supercritical extraction procedure, the GC for the material showed 100% extraction of the impurities.

The results of these experiments are summarized in Table 2.

TABLE 2

Pilot Scale Supercritical $CO_2$ Extraction Experiments

| Example | Press. psi (kg/cm²) | Temp. (° C.) | Time (min) | Comment | % impurities extracted |
|---|---|---|---|---|---|
| 9 | 9500 (667.92) | 100 | 40 + 90 hold | 3 pressure cycles to 7000 during static hold. | 20 |
| 10 | 9500 (667.92) | 120 | 40 + 315 flow/hold | 7 flow/hold cycles of 30/15 min. | 100 |
| 11 | 9500 (667.92) | 120 | 80 + 360 flow/hold | 6 flow/hold cycles of 45/15 min | 100 |
| 12 | 9500 (667.92) | 120 | 140 | Lower flow rate (15 L/min) | 100 |

As the results in Table 2 indicate, it is possible to achieve similar levels of contaminants removal at the 320 g scale, when compared to the 20 g or 40 g. scale of Examples 5 to 8, provided that supercritical extraction conditions are adapted to the new conditions. In particular, Example 12 shows that good results can be achieved using slow flow rates and longer extraction times without the need for pressure cycles or alternating periods of hold and flow.

The ability of the ultrapurified olefinic polymer resin material to produce ultrapure articles of manufacture without the recurrence of monomeric, olgomeric and shot chain polymer impurities during the article molding process is illustrated by the following Examples 13. In this Example the articles were molded using a 32 cavity mold employing the following molding conditions: nozzle temperature 445-455° F. (229.4-235° C.), mold temperature of 50-55° F. (10-12.8° C.), fill time of 1.14-1.15 sec., cooling time 2.3-3.5 sec., and a cycle time of 14-16 sec.

EXAMPLE 13

Four articles of manufacture were molded from the ultrapurified polypropylene material purified by the supercritical $CO_2$ extraction process of Example 11 and the molded articles were analyzed by analysis of the methylene chloride extract by gas chromatography using the analysis conditions described in Example 1. All the physical characteristics of the extruded article were normal and the amount of residuals extracted by methylene chloride was one peak of less than 1 ppm extractable, as determined by the use of 20 ppm undecene as the internal standard. In contrast, when untreated polypropylene pellets were similarly extruded into such articles of manufacture under identical molding conditions, analysis of the methylene chloride gas extract by gas chromatography showed the presence of 20 peaks, each representing 3 to 50 ppm of extractable, as determined by the use of 20 ppm undecene as the internal standard.

The long term ultrapurity of polymeric material cleaned in accordance with this invention is illustrated by the following example.

EXAMPLE 14

The original and cleaned polypropylene beads purified as in Example 10 were extracted with methylene chloride by equilibrating on a mechanical shaker for three months. Extracts were analyzed by GC conditions as described in Example 1, except initial hold temp was 40° C. The results show that no additional impurities are were generated in or extracted from beads and indicate that extracted beads remained clean.

Articles prepared by injection molding from pellets cleaned or purified in accordance with the purification method of this invention were used in their intended applications without any difficulties. After over two years of storage, the articles did not show any changes in physico-chemical properties, appearance or level of impurities.

Finally, as the molding experiment (Example 13) indicates, not only do the cleaned pellets produce articles having good physical properties, but the low levels of extractibles achieved in the pellets through supercritical $CO_2$ extraction is preserved in the molded articles.

Because of the high pressures, 4000 psi minimum (281.23 kg/cm$^2$), and temperatures, 35° C. minimum, required to bring $CO_2$ in the supercritical region for the process according to this invention, the extraction equipment needed tends to be more complex and expensive than conventional solvent extraction systems. In some cases. However, this factor is more than offset, in the long run, by savings in the elimination of solvent usage/disposal and drying costs.

Extractions using supercritical $CO_2$ avoid a lot of the problems associated with liquid extraction: the fluid used is non-flammable and non-toxic, it can be removed effectively from the polymer phase by simple de-pressurization and, although it can be released, recycling is also possible without costly purification steps. The supercritical $CO_2$ extraction procedure can actually be performed in a closed loop in which the $CO_2$ used for the extraction is purified in a suitable separator, liquefied by cooling and pumped right back into the extraction chamber.

In accordance with this invention ultrapure articles of manufacture can be manufactured. Such ultrapure article of manufacture include, but are not limited to the following type articles where ultrapurity is required or desired: bottles and drums to be used as packaging for ultrapure chemicals or reagents, beakers, funnels, separatory funnels, reactors and chambers, plastic columns, pipes, tubing, connectors, screens and adapters to be used in laboratory equipment and instruments, blood bags, oxygen tubing, intravenous equipment, enteral food or parental nutrition bags, implants, food packaging, and toys.

While the invention has been described herein with reference to the specific embodiments thereof, it will be appreciated that changes, modification and variations can be made without departing from the spirit and scope of the inventive concept disclosed herein. Accordingly, it is intended to embrace all such changes, modification and variations that fall with the spirit and scope of the appended claims.

We claim:

1. A process for providing an ultrapure article of manufacture, the process comprising:
   A) providing olefinic polymeric material containing impurities,
   B) subjecting the olefinic polymeric material to supercritical $CO_2$ at a pressure of at least about 4000 psi (281.23 kg/cm$^2$) at a temperature of from about 35° C. and above, and wherein the olefinic polymeric material is subjected to the supercritical $CO_2$ in a series of alternating periods of supercritical $CO_2$ flows and static periods of non $CO_2$ flows but a supercritical $CO_2$ environment to extract the impurities from the olefinic polymeric material and produce ultrapure olefinic polymeric material wherein the detectable level of impurities in the purified olefinic material is less than about 5 ppm, and
   C) molding an ultrapure article of manufacture from the ultrapure olefinic polymeric material and wherein the impurities does not reoccur.

2. A process according to claim 1 wherein the supercritical $CO_2$ is at a pressure of from about 4000 psi (281.23 kg/cm$^2$) to about 10,000 psi (703.67 kg.cm$^2$) at a temperature of from about 50° C. to about 120° C.

3. A process according to claim 2 wherein the supercritical $CO_2$ is at a pressure of from about 9500 psi (667.92 kg/cm$^2$) and at a temperature of from about 100° C. to about 120° C.

4. A process according to claim 1 wherein the olefinic polymer is selected from the group consisting of polyethylene, polypropylene, polybutene and poly methylpentene.

5. A process according to claim 3 wherein the olefinic polymer is selected from the group consisting of polyethylene, polypropylene, polybutene and poly methylpentene.

6. A process according to claim 1 wherein the olefinic polymer is polypropylene.

7. A process according to claim 3 wherein the olefinic polymer is polypropylene.

8. A process according to claim 1 wherein the olefinic polymeric material is subjected to the supercritical $CO_2$ at a $CO_2$ flow rate of from about 10 to about 20 L/min.

9. A process according to claim 7 wherein the polypropylene material is subjected to the supercritical $CO_2$ at a $CO_2$ flow rate of from about 10 to about 20 L/min.

10. A process according to claim 2 wherein the olefinic polymeric material is subjected to the supercritical $CO_2$ at a $CO_2$ flow rate of from about 10 to about 20 L/min.

11. A process according to claim 3 wherein the olefinic polymeric material is subjected to the supercritical $CO_2$ at a $CO_2$ flow rate of from about 10 to about 20 L/min.

12. A process according to claim 4 wherein the olefinic polymeric material is subjected to the supercritical $CO_2$ at a $CO_2$ flow rate of from about 10 to about 20 L/min.

13. An ultrapure article article of manufacture produced according to a process for providing an ultrapure article of manufacture, the process comprising:
   A) providing olefinic polymeric material containing impurities,
   B) subjecting the olefinic polymeric material to supercritical $CO_2$ at a pressure of at least about 4000 psi (281.23 kg/cm$^2$) at a temperature of from about 35° C. and above, and wherein the olefinic polymeric material is subjected to the supercritical $CO_2$ in a series of alternating periods of supercritical $CO_2$ flows and static periods of non $CO_2$ flows but a supercritical $CO_2$ environment to extract the impurities from the olefinic polymeric material and produce ultrapure olefinic polymeric material wherein the detectable level of impurities in the purified olefinic material is less than about 5 ppm, and C) molding an ultrapure article of manufacture from the ultrapure olefinic polymeric material and wherein the impurities does not reoccur.

14. An ultrapure article of manufacture according to claim 13 wherein the article of manufacture is selected from the group consisting of: bottles and drums to be used as packaging for ultrapure chemicals or reagents, beakers, funnels, separatory funnels, reactors and chambers, plastic columns, pipes, tubing, connectors, screens and adapters to be used in laboratory equipment and/instruments, blood bags, oxygen tubing, intravenous equipment, enteral food or parental nutrition bags, implants, food packaging, and toys.

* * * * *